(12) United States Patent
Kadosh et al.

(10) Patent No.: US 12,301,359 B2
(45) Date of Patent: May 13, 2025

(54) SYSTEMS AND METHODS OF INSERTING IDLES WITHIN PACKETS TO REDUCE LATENCY

(71) Applicant: Cisco Technology, Inc., San Jose, CA (US)

(72) Inventors: Aviran Kadosh, Moreshet (IL); Mohammad Issa, Los Altos, CA (US); Matthew Todd Lawson, Grass Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 5 days.

(21) Appl. No.: 18/511,952

(22) Filed: Nov. 16, 2023

(65) Prior Publication Data

US 2024/0405921 A1    Dec. 5, 2024

Related U.S. Application Data

(60) Provisional application No. 63/506,223, filed on Jun. 5, 2023.

(51) Int. Cl.
*H04L 1/1607* (2023.01)
*H04L 1/00* (2006.01)
*H04L 1/1867* (2023.01)

(52) U.S. Cl.
CPC .......... *H04L 1/1678* (2013.01); *H04L 1/0047* (2013.01); *H04L 1/188* (2013.01)

(58) Field of Classification Search
CPC ...... H04L 1/1678; H04L 1/0047; H04L 1/188
See application file for complete search history.

(56) References Cited

U.S. PATENT DOCUMENTS 6,085,248 A    7/2000  Sambamurthy et al.
7,949,002 B1   5/2011  Lo et al.
(Continued)

FOREIGN PATENT DOCUMENTS

CN    112350798 A    2/2021

OTHER PUBLICATIONS

Feather F., et al., "Fault Detection in an Ethernet Network using Anomaly Signature Matching", Computer Communication Review, ACM, New York, NY, US, vol. 23, No. 4, Oct. 1, 1993, pp. 279-288, XP058082741, ISSN: 0146-4833, DOI: 10.1145/167954.166264, the whole document.

(Continued)

*Primary Examiner* — Thien Nguyen
(74) *Attorney, Agent, or Firm* — Rutan & Tucker, LLP; Ravi Mohan

(57) ABSTRACT

Devices, systems, methods, and processes for transmitting and receiving one or more data packets are described herein. A device may face an internal non-deterministic delay in processing causing a gap or an interruption during transmission of the data packet. During the gap, the device can transmit one or more Intra-Packet Idle (IPI) words between the transmission of the data packet. The IPI words can be ignored or discarded by a receiver. The device may transmit the data packet into multiple parts by transmitting the IPI words between the parts. The receiver can receive the parts of the data packet and the IPI words and retrieve the data packet based on the parts of the data packet. The device may set a configurable threshold value indicative of a maximum number of the IPI words that can be transmitted during the gap of the interruption, such that the receiver can efficiently identify and discard a runt packet. The device does not require a buffer to fetch and store the data packet prior to the (Continued)

transmission, thereby eliminating a latency caused by the buffer.

20 Claims, 10 Drawing Sheets

(56) References Cited

U.S. PATENT DOCUMENTS

| | | |
|---|---|---|
| 2002/0126704 A1 | 9/2002 | Cam et al. |
| 2012/0328289 A1* | 12/2012 | Julien .................. H04L 49/557 398/45 |
| 2017/0366337 A1 | 12/2017 | Huang |
| 2019/0044657 A1 | 2/2019 | Biederman et al. |

OTHER PUBLICATIONS

International Search Report and Written Opinion for International Application No. PCT/US2024/031172, mailed Sep. 10, 2024, 25 Pages.

McClellan B., et al., "80/81 PCS State Machines for EEE", IEEE Draft, MCCLELLAN_3BP_04_0115, IEEE-SA, Piscataway, NJ, USA, vol. 802.3, Jan. 14, 2015, pp. 1-9, XP068080181, p. 3-p. 4.

* cited by examiner

FIG. 3

| TXC | TXD | Description | PLS_DATA.request parameter |
|---|---|---|---|
| 0 | 0x00 through 0xFF | Normal data transmission | Zero, one (eight bits) |
| 1 | 0x00 through 0x05 | Reserved | — |
| 1 | 0x06 | Only valid on all 8 lanes simultaneously to request LPI | No applicable parameter (normal inter-frame) |
| 1 | 0x07 | Idle | No applicable parameter (normal inter-frame) |
| 1 | 0x08 through 0x9B | Reserved | — |
| 1 | 0x9C | Sequence (only valid in lane 0) | No applicable parameter (inter-frame status signal) |
| 1 | 0x9D through 0xFA | Reserved | — |
| 1 | 0xFB | Start (only valid in lane 0) | No applicable parameter, replaces first eight zero, one of a frame (preamble octet) |
| 1 | 0xFC | Reserved | — |
| 1 | 0xFD | Terminate | DATA_COMPLETE |
| 1 | 0xFE | Error | No applicable parameter |
| 1 | 0xFF | Reserved | — |

Add a control word /IPI/:

| 1 | 0xAA | Intra-Packet Idle - only valid on all 8 lanes simultaneously | No applicable parameter |
|---|---|---|---|

| Input Data | Sync | Block Payload | | | | | | | |
|---|---|---|---|---|---|---|---|---|---|
| Bit Position: | 0 1 | 2 | | | | | | | 65 |
| Data Block Format: | | | | | | | | | |
| $D_0D_1D_2D_3D_4D_5D_6D_7$ | 01 | $D_0$ | $D_1$ | $D_2$ | $D_3$ | $D_4$ | $D_5$ | $D_6$ | $D_7$ |
| Control Block Formats: | | Block Type Field | | | | | | | |
| $C_0C_1C_2C_3C_4C_5C_6C_7$ | 10 | 0x1E | $C_0$ | $C_1$ | $C_2$ | $C_3$ | $C_4$ | $C_5$ | $C_6$ | $C_7$ |
| $S_0D_1D_2D_3D_4D_5D_6D_7$ | 10 | 0x78 | $D_1$ | $D_2$ | $D_3$ | $D_4$ | $D_5$ | $D_6$ | $D_7$ |
| $O_0D_1D_2D_3Z_4Z_5Z_6Z_7$ | 10 | 0x4B | $D_1$ | | $O_0$ | 0x000_0000 | | | |
| $T_0C_1C_2C_3C_4C_5C_6C_7$ | 10 | 0x87 | | $C_1$ | $C_2$ | $C_3$ | $C_4$ | $C_5$ | $C_6$ | $C_7$ |
| $D_0T_1C_2C_3C_4C_5C_6C_7$ | 10 | 0x99 | $D_0$ | | $C_2$ | $C_3$ | $C_4$ | $C_5$ | $C_6$ | $C_7$ |
| $D_0D_1T_2C_3C_4C_5C_6C_7$ | 10 | 0xAA | $D_0$ | $D_1$ | | $C_3$ | $C_4$ | $C_5$ | $C_6$ | $C_7$ |
| $D_0D_1D_2T_3C_4C_5C_6C_7$ | 10 | 0xB4 | $D_0$ | $D_1$ | $D_2$ | | $C_4$ | $C_5$ | $C_6$ | $C_7$ |
| $D_0D_1D_2D_3T_4C_5C_6C_7$ | 10 | 0xCC | $D_0$ | $D_1$ | $D_2$ | $D_3$ | | $C_5$ | $C_6$ | $C_7$ |
| $D_0D_1D_2D_3D_4T_5C_6C_7$ | 10 | 0xD2 | $D_0$ | $D_1$ | $D_2$ | $D_3$ | $D_4$ | | $C_6$ | $C_7$ |
| $D_0D_1D_2D_3D_4D_5T_6C_7$ | 10 | 0xE1 | $D_0$ | $D_1$ | $D_2$ | $D_3$ | $D_4$ | $D_5$ | | $C_7$ |
| $D_0D_1D_2D_3D_4D_5D_6T_7$ | 10 | 0xFF | $D_0$ | $D_1$ | $D_2$ | $D_3$ | $D_4$ | $D_5$ | $D_6$ | |

Add encoding for /IPI/:

| |0|1|2|3|4|5|6|7 | 10 | 0xFF | |0 | |1 | |2 | |3 | |4 | |5 | |6 | |7 |

IPI control character, /IPI/, is similar to Idle control characters (/I/) - see clause 82.2.3.6:
- /IPI/ is transmitted in groups of 8 bytes
- /IPI/ can be deleted to adapt between clock rate, but cannot be inserted
- /IPI/ can only be transmitted after data character or /IPI/

FIG. 4

NOTE-Optional state (inside the dotted box) and transition E are only required to support EEE capability

SYSTEMS AND METHODS OF INSERTING IDLES WITHIN PACKETS TO REDUCE LATENCY

The present disclosure relates to communication networks. More particularly, the present disclosure relates to inserting Intra-Packet Idle (IPI) words while transmitting a data packet in a communication network. This application claims priority to U.S. Provisional Patent Application Ser. No. 63/506,223 filed Jun. 5, 2023, which is incorporated by reference in its entirety.

BACKGROUND

Ethernet is a widely used networking technology that defines rules and standards for transmitting data packets over a local area network (LAN). Ethernet divides data into smaller units generally referred to as frames, which are transmitted independently in a network. Each frame includes a header with control information, payload data, and trailer. The frames are sent over the network. A destination device receives the frames and reassembles the frames to retrieve the data.

Ethernet networks use a shared medium, which means that multiple devices on the network contend for access to the network. When this contention becomes too high, it may lead to congestion. To mitigate the congestion, additional stages of store-and-forward may be added in one or more switches in the network. These additional stages allow the switch to buffer and process data packets more effectively, reducing a likelihood of packet loss or delay. When the data packets are transmitted continuously, however, new switches are forced to have another stage of store-and-forward with respect to a transmit Media Access Control (MAC), thereby introducing latency.

In high bandwidth switches, this latency may not be deterministic, thus increasing an amount of data that is required to be pre-fetched before transmitting the packet and thereby increasing the latency within a device. Furthermore, in many switches, a packet is fully stored in the pre-fetch before transmission. This latency can approach approximately 735.36 ns for a Maximum Transmission Unit (MTU) packet (e.g., 9192*8/100 G=735.36 ns). When the data packet is not sent continuously, and there is a gap, i.e., idle, within the data packet, a receiver may take a precautionary measure by declaring the packet as corrupted or underrun. In such instances, the data packet is discarded. Therefore, the data packet is effectively removed from further processing or utilization.

SUMMARY OF THE DISCLOSURE

Systems and methods for inserting Intra-Packet Idle (IPI) words while transmitting a data packet in a communication network in accordance with embodiments of the disclosure are described herein.

In some embodiments, a device, includes a processor, a memory communicatively coupled to the processor, and a transmission logic. The logic is configured to receive a bitstream corresponding to a data packet, detect an interruption in a reception of the bitstream, generate an intra-packet idle word based on the interruption, encode the intra-packet idle word to generate an encoded intra-packet idle word, and transmit a physical idle signal indicative of the encoded intra-packet idle word.

In some embodiments, the memory is configured to store a configurable threshold value indicative of a maximum number of times of transmission of the physical idle signal during the interruption.

In some embodiments, the transmission logic is further configured to transmit the physical idle signal based on the configurable threshold value during the interruption, determine if the reception of the bitstream resumes after transmitting the physical idle signal, and transmit a physical error signal if the reception of the bitstream does not resume.

In some embodiments, when the configurable threshold value is zero, the transmission logic is further configured to transmit the physical idle signal repeatedly until the reception of the bitstream resumes.

In some embodiments, the configurable threshold value is greater than a maximum expected latency for the data packet.

In some embodiments, the intra-packet idle word includes a predetermined bit sequence.

In some embodiments, the transmission logic is further configured to select a bit sequence for the intra-packet idle word based on a required error correction metric.

In some embodiments, the transmission logic is further configured to determine an encoding standard corresponding to a type of a physical channel.

In some embodiments, the transmission logic is further configured to encode at least one of the intra-packet idle word or the data packet based on the encoding standard.

In some embodiments, the transmission logic is further configured transmit a physical data signal indicative of an encoded data packet.

In some embodiments, the physical idle signal, the physical data signal, and the physical error signal are transmitted at a physical (PHY) layer in a communication network, and wherein the data packet is received from a Media Access Control (MAC) layer in the communication network.

In some embodiments, the device operates at a Reconciliation Sublayer (RS) in the communication network.

In some embodiments, a device includes a processor, a memory communicatively coupled to the processor, and a reception logic. The logic is configured to initiate a receive state, receive a first physical data signal, decode the first physical data signal to retrieve a first part of a data packet, receive a physical idle signal, decode the physical idle signal to retrieve an intra-packet idle word, maintain the receive state based on the intra-packet idle word, receive a second physical data signal, decode the second physical data signal to retrieve a second part of the data packet, and retrieve the data packet based on the first part of the data packet and the second part of the data packet.

In some embodiments, the reception logic is further configured to receive a physical error signal after receiving the first physical data signal, wherein the physical error signal is indicative of a runt packet, and discard the first part of the data packet based on the physical error signal.

In some embodiments, a method includes receiving a bitstream corresponding to a data packet, detecting an interruption in a reception of the bitstream, generating an intra-packet idle word based on the interruption, encoding the intra-packet idle word for generating an encoded intra-packet idle word, and transmitting a physical idle signal indicative of the encoded intra-packet idle word.

In some embodiments, a method further includes storing a configurable threshold value indicative of a maximum number of times of transmission of the physical idle signal during the interruption.

In some embodiments, a method further includes transmitting the physical idle signal based on the configurable threshold value during the interruption, determining if the reception of the bitstream resumes after transmitting the physical idle signal, and transmitting a physical error signal if the reception of the bitstream does not resume.

In some embodiments, a method further includes selecting a bit sequence for the intra-packet idle word based on a required error correction metric.

In some embodiments, a method further includes determining an encoding standard corresponding to a type of a physical channel, and encoding at least one of the intra-packet idle word or the data packet based on the encoding standard.

In some embodiments, a method further includes transmitting a physical data signal indicative of an encoded data packet.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 3 is a conceptual illustration of changes to a Reconciliation Sublayer (RS), in accordance with various embodiments of the disclosure;

FIG. 4 is a conceptual illustration of changes to a Physical Coding Sublayer (PCS), in accordance with various embodiments of the disclosure;

Figure 1:
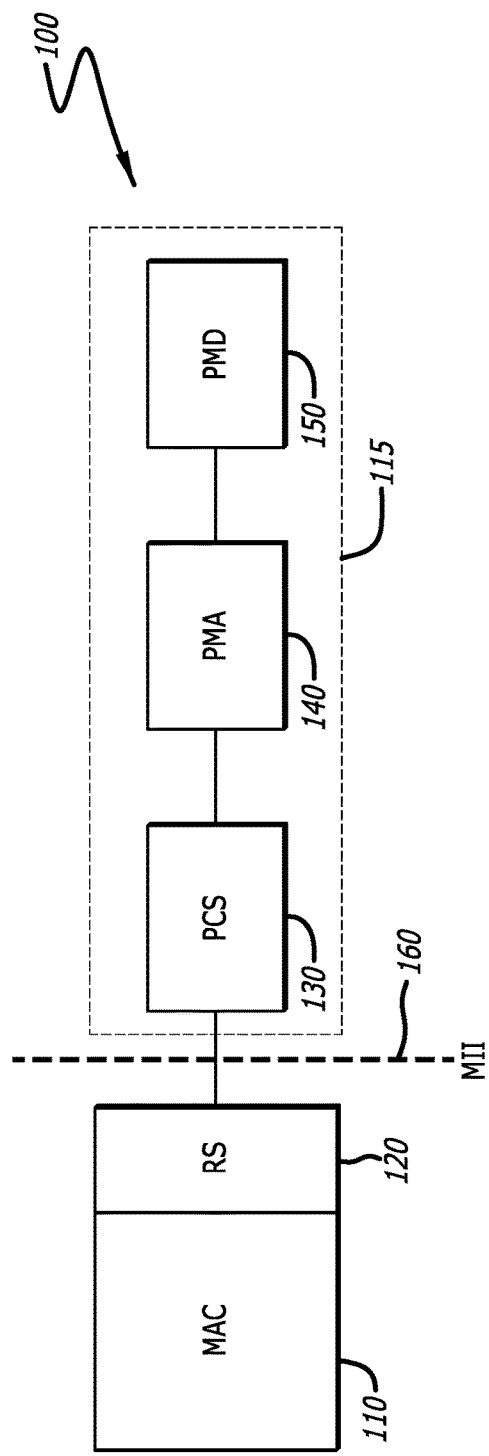
FIG. 1 is a conceptual illustration of multiple communication layers in a communication network, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that insert Intra-Packet Idle (IPI) words while transmitting a data packet in a communication network. In Ethernet, data packets may be transmitted from a transmitter to a receiver within the communication network. The data packet may correspond to a user data or a control information transmitted from the transmitter to the receiver. In many embodiments, the transmitter can receive a first bitstream corresponding to a first part of the data packet. The first bitstream may be generated by a processing component within a device that includes the transmitter. The transmitter may encode the first bitstream to generate an encoded first bitstream. The transmitter may further generate a first physical data signal corresponding to the encoded first bitstream. The transmitter can transmit the first physical data signal to the receiver over a physical channel. However, there may exist delays or interruptions in receiving the first bitstream due to internal non-deterministic processing time in the device. In some embodiments, the internal non-deterministic processing time may be caused by loss of internal information at one or more communication layers. When the transmitter detects an interruption or a gap, the transmitter may generate one or more IPI words based on the interruption or the gap. In certain embodiments, each IPI word may include a predetermined bit sequence. In more embodiments, the transmitter may select the bit sequence for the IPI word based on a required error correction metric, such as, but not limited to, a minimum Hamming distance. The transmitter can further encode the IPI word to generate an encoded IPI word. The transmitter may generate a physical idle signal indicative of the IPI word. The physical idle signal may be transmitted to the receiver. After resuming the reception, the transmitter may receive a second bitstream corresponding to a second part of the data packet. The transmitter may encode the second bitstream to generate an encoded second bitstream. The transmitter may further generate a second physical data signal corresponding to the encoded second bitstream. The transmitter can transmit the second physical data signal to the receiver over the physical channel.

In a number of embodiments, the receiver may be in a receive state to receive the data packet. In the receive state, the receiver may receive the first physical data signal. The receiver can decode the first physical data signal to retrieve the first part of the data packet. The receiver may then receive the physical idle signal. The receiver can decode the physical idle signal to retrieve the IPI word. In some embodiments, the receiver may discard or ignore the IPI word while maintaining the receive state. That is, after receiving the IPI word, the receiver may not move to an error state and may wait in the receive state to receive the second physical data signal. The receiver may further receive the second physical data signal and decode the second physical data signal to retrieve the second part of the data packet. The receiver can retrieve the data packet in entirety based on the first part of the data packet and the second part of the data packet.

In various embodiments, the transmitter can transmit multiple IPI words during the interruption or the gap. However, in some embodiments, the transmitter may face the interruption due to internal loss of data packet or internal errors of the device. To avoid a lock due to lost data packets or internal errors, the transmitter can store a configurable threshold value in a memory. The configurable threshold value may indicate of a maximum number of times of transmission of the physical idle signal during the interruption. In certain embodiments, the transmitter may only transmit as many IPI words as indicated by the configurable threshold value. That is, the transmitter may transmit the physical idle signal based on the configurable threshold value. After transmitting a maximum number of IPI words indicated by the configurable threshold value, the transmitter may determine if the reception of the bitstream resumes. If the reception of the bitstream does not resume, the transmitter may generate a physical error signal. The physical error signal may indicate that the data packet may be a runt packet, corrupted, or underrun, and hence, can be discarded by the receiver. The transmitter may transmit the physical error signal to the receiver. In more embodiments, the receiver may receive the physical error signal after receiving the first physical data signal. The receiver may discard the first part of the data packet based on the received physical error signal.

In additional embodiments, the transmitter may determine an encoding standard corresponding to a type of the physical channel. The transmitter can encode one or more data, such as, but not limited to, the IPI word or the data packet based on the encoding standard. In some embodiments, one or more physical signals, such as, but not limited to, the physical idle signal, the physical data signal, and the physical error signal can be transmitted at a physical (PHY) layer in a communication network. In certain embodiments, the data packet may be received from a Media Access Control (MAC) layer in the communication network. In more embodiments, the device that includes the transmitter or the receiver may operate at a Reconciliation Sublayer (RS) in the communication network.

Advantageously, the device may not require a buffer for pre-fetching storing the data packets before transmission. This may result into reduced processing time and reduced latency due to elimination of buffering. This may further result into faster communication and improvement in efficiency of transmission of the data packets by the device. The transmitter and receiver of the present disclosure can also accommodate interruptions in the transmission of the data packets without resulting into error at the receiver. That is, the receiver may successfully retrieve the data packets even after interruptions or gaps in the reception of the data packets, without discarding the data packets as runt packets, corrupted, or underrun. Transmission and reception methods of the present disclosure also provide mechanisms for avoiding the lock due to internal packet loss or internal errors. In that, the transmitter can transmit the IPI words based on the configurable threshold value such that the maximum number of transmitted IPI words during one interruption does not exceed the configurable threshold value. Further, the configurable threshold value can be modified or designed to suit a requirement of an application.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of multiple communication layers 100 in a communication network, in accordance with various embodiments of the disclosure is shown. The communication layers 100 may include a Media Access Control (MAC) layer 110 and a Physical (PHY) layer 115. The PHY layer 115 can include a Reconciliation Sublayer (RS) 120, a Physical Coding Sublayer (PCS) 130, a Physical Medium Attachment (PMA) 140, and a Physical Medium Dependent (PMD) sublayer 150. A Media Independent Interface (MII) 160 may provide a standardized interface between the MAC layer 110 and the PHY layer 115.

In many embodiments, the MAC layer 110 may manage access to a transmission medium and control a flow of data between the PHY layer 115 and higher layers of a communication protocol stack. The MAC layer 110 may also perform addressing, error checking, and data packetization, without limitation. The RS 120 can refer to a component of the PHY layer 115 that facilitates communication between the MAC layer 110 and the PMD sublayer 150. Further, the RS 120 can also be utilized to adapt one or more data formats and timings between layers, thereby ensuring compatibility and proper transmission over a physical medium. In some embodiments, the RS 120 may be configured to perform frame synchronization, clock recovery, and insertion or removal of start-of-frame and end-of-frame delimiters. In general, the RS 120 can serve as a bridge between the MAC layer 110 which operates with frames, and the PMD sublayer 150, which deals with the physical transmission characteristics, allowing for seamless communication between these layers.

In a number of embodiments, the PCS 130 can encode or decode a data to be transmitted over the physical medium. The PCS 130 may perform one or more functions, such as, but not limited to, scrambling, encoding, or decoding. The scrambling may be utilized to randomize data to improve one or more transmission characteristics, while the encoding may be utilized to convert a scrambled data into a format suitable for transmission. In some embodiments, the PMA 140 may be configured to interface between the PCS 130 and the PMD sublayer 150. In certain embodiments, an encoded data from the PCS 130 may be encoded into one or more physical signals suitable for transmission over the physical medium. The PMA 140 may also include components such as line drivers and receivers that amplify and condition the physical signals.

In various embodiments, the PMD sublayer 350 may defines details regarding transmission and reception of individual bits on the physical medium. The PMD sublayer 150 may encompass bit timing, signal encoding, or interacting with the physical medium, and properties of various cables, optical fibers, or wires, for example. The PMD sublayer 150 can further include components such as transceivers and equalizers that adapt the physical signals to the characteristics of the physical medium and compensate for distortions and noise. The MII 160 can provide a standardized interface between the MAC layer 110 and the PHY layer 115. The MII 160 can define one or more electrical and mechanical characteristics of the interface, thereby allowing the MAC layer 110 to communicate with different PHY devices. In some embodiments, the MII 160 may include a set of pins or signals that carry control and data information between the MAC layer 110 and the PHY layer 115.

In additional embodiments, when a device transmits a data packet that is smaller than the minimum allowed size, it may be considered a runt packet. This may occur due to various reasons, such as errors during transmission or issues with the Network Interface Card (NIC). The runt packets may also occur when there is a mismatch in the configuration of network devices, such as mismatched Maximum Transmission Unit (MTU) settings. The runt packets are generally undesirable and can cause problems in network communications. The runt packets can result in performance issues, increased network traffic, and potential data loss. Different network devices may handle the runt packets differently based on their configuration. Some devices may discard the runt packets, while others may attempt to forward them. To troubleshoot the runt packets, network administrators typically examine network interfaces, check for configuration mismatches, and inspect error logs. Addressing any underlying issues, such as correcting configuration settings or replacing faulty hardware, can help eliminate the runt packet occurrences and ensure smooth network operation.

In further embodiments, the runt packets may be caused in several scenarios. For example, collisions may occur when two or more devices attempt to transmit data simultaneously on a shared medium (e.g., a network segment). The collisions are more common in half-duplex Ethernet networks, where the devices cannot transmit and receive data simultaneously. When a collision occurs, colliding packets may be truncated, resulting in one or more runt packets. The collisions may often occur due to network congestion, excessive network traffic, or a faulty network interface, but may be less relevant for point-to-point full duplex communication.

In many more embodiments, similarly, line errors can corrupt the data being transmitted, leading to the creation of runt packets if the received data is smaller than the minimum required size or Physical Coding Sublayer (PCS) sync header corruption. The line errors may be minimized by Forward Error Correction (FEC). Finally, when a transmission (TX) error occurs, it can result in the generation of the runt packets if the transmitted packets are smaller than the minimum allowed size as well. The TX errors may also be due to internal non-deterministic processing time. It should be appreciated that internal TX processing time is not deterministic due to scheduling and packet editing. To that end, even data memory architecture is not deterministic because of read access to memory, and the differences between internal memory and external memory.

In many additional embodiments, to handle the internal non-deterministic processing time, the switches may buffer some amount of packet data before starting packet transmission. It should be understood there is a minimum threshold between packet size and configurable size. Ideally, the configurable size includes tuning and covers a worst-case processing time. Accordingly, most default configurations are set to MTU. In some embodiments, buffering data may add a hidden latency of 100s of nanoseconds. For example: 9 KB/100 Gbps=737 ns. To that end, latency may be hidden and might not appear in latency reports. Numbers typically show 64 B-256 B packets and low utilization. This can impact real world latency for large packets workload, e.g., instances of Artificial Intelligence (AI) and Machine Learning (ML).

Although a specific embodiment for the communication layers 100 for carrying out the various steps, processes, methods, and operations described herein is discussed with respect to FIG. 1, any of a variety of systems and/or processes may be utilized in accordance with embodiments of the disclosure. For example, the communication layers 100 may include a transmitter and/or a receiver configured to share data packets through Ethernet. The elements depicted in FIG. 1 may also be interchangeable with other elements of FIGS. 2-11 as required to realize a particularly desired embodiment.

Figure 2:
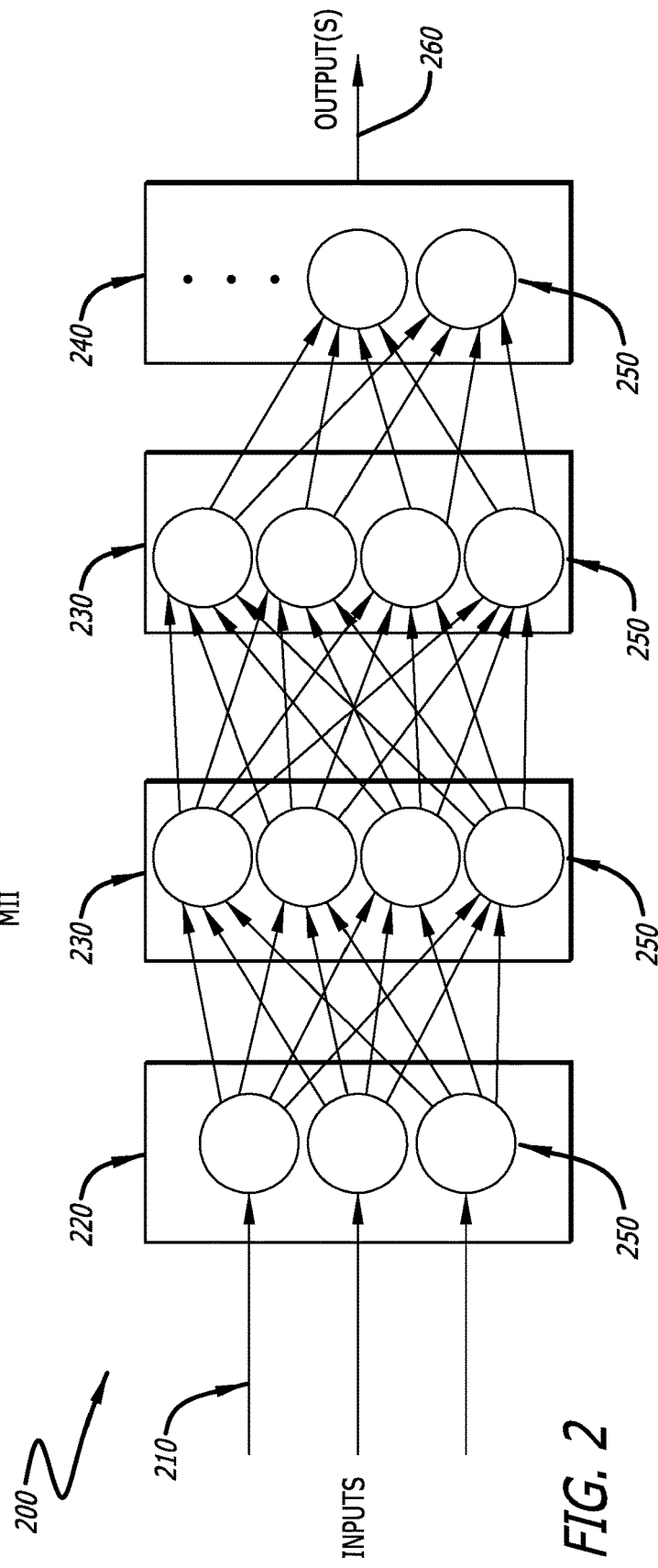
FIG. 2 is a conceptual illustration of an artificial neural network, in accordance with various embodiments of the disclosure.

Referring to FIG. 2, a conceptual illustration of an artificial neural network 200, in accordance with various embodiments of the disclosure is shown. As those skilled in the art will recognize, various methods of machine learning models can be utilized to achieve desired outcomes efficiently. For example, some embodiments may utilize decisions trees, random forests, support vector machines, naïve Bayes, or K-nearest neighbors' algorithms. However, artificial neural networks have increased in popularity, especially in deep learning techniques where detection of complex patterns in data and the ability to solve a wide range of problems has been desired. In some embodiments, the artificial neural network 200 may be utilized. The artificial neural networks are a type of machine learning model inspired by the structure and function of the human brain, and often consist of three main types of layers: the input layer, the output layer, and one or more intermediate (also called hidden) layers.

In many embodiments, the input layer may receive input data, which could be anything from an image to a text document to numerical values. Each input feature can be represented by a node in the input layer. Conversely, the output layer may often produce an output of the artificial neural network 200, which could be, for example, a prediction or a classification. In some embodiments, a number of nodes in the output layer can depend on the task at hand. If the task is to classify the images into ten different categories, there can be ten nodes in the output layer, each representing a different category.

In a number of embodiments, the intermediate layers are where specialized connections can be made. The intermediate layers may transform the input data in a non-linear way to extract meaningful features that can be used for the final output. In some embodiments, a node in an intermediate layer can receive as an input a weighted sum of the outputs from a previous layer, apply a non-linear activation function to it, and pass the result on to a next layer. The weights of the connections between nodes in the layers may be learned during training. The training can utilize backpropagation, which may involve calculating the gradient of the error with respect to the weights and adjusting the weights accordingly to minimize the error.

In various embodiments, at a high level, the artificial neural network 200 depicted in the embodiment of FIG. 2 includes a number of inputs 210, an input layer 220, one or more intermediate layers 230, and an output layer 240. The artificial neural network 200 may comprise a collection of connected units or nodes referred to as artificial neurons 250, which loosely model the neurons in a biological brain. Each connection, like synapses in a biological brain, can transmit a signal from one artificial neuron to another. An artificial neuron that receives a signal can process the signal and then trigger additional artificial neurons within the next layer of the neural network. As those skilled in the art will recognize, the artificial neural network 200 depicted in FIG. 2 is shown as an illustrative example, and various embodiments may comprise artificial neural networks that can accept more than one type of input and can provide more than one type of output.

In additional embodiments, the signal at a connection between the artificial neurons is a value, and the output of each artificial neuron can be computed by a nonlinear function (also referred to as an activation function) of the sum of the artificial neuron's inputs. Often, the connections between artificial neurons may be called "edges" or axons. The artificial neurons and edges typically have a weight that adjusts as learning proceeds. The weight increases or decreases the strength of the signal at a connection. The artificial neurons may have a threshold (trigger threshold) such that the signal is only sent if an aggregate signal crosses the threshold. Typically, the artificial neurons can be aggregated into layers. Different layers may perform different kinds of transformations on their inputs. Signals may propagate from the first layer (the input layer 220) to the last layer (the output layer 240), possibly after traversing one or more intermediate layers (also referred to as hidden layers) 230.

In further embodiments, the inputs to an artificial neural network may vary depending on the problem being addressed. In object detection for example, the inputs may be data representing values for certain corresponding actual measurements or values within the object to be detected. In some embodiments, the artificial neural network 200 may include a series of hidden layers in which each neuron is fully connected to neurons of the next layer. The artificial neural network 200 can also utilize the activation function such as sigmoid, nonlinear, or a rectified linear unit (ReLU), upon the sum of the weighted inputs, for example. The last layer in the artificial neural network may implement a regression function to produce the classified or predicted classifications output for object detection as output 260. In certain embodiments, a sigmoid function can be used, and the prediction may need raw output transformation into linear and/or nonlinear data.

Although a specific embodiment for an artificial neural network machine learning model suitable for carrying out the various steps, processes, methods, and operations described herein is discussed with respect to FIG. 2, any of a variety of systems and/or processes may be utilized in accordance with embodiments of the disclosure. For example, the artificial neural network may be external operated, such as through a cloud-based service, or a third-party service. The elements depicted in FIG. 2 may also be interchangeable with other elements of FIGS. 1 and 3-11 as required to realize a particularly desired embodiment.

Referring to FIG. 3, a conceptual illustration of changes to the RS, in accordance with various embodiments of the disclosure are shown. FIG. 4 also shows encodings of TXC and TXD in accordance with various embodiments of the disclosure. As shown, an Intra-Packet Idle (IPI) word may be added, and TXC may be set to "1" and TXD may be set to "0xAA", by way of a non-limiting example. In some embodiments, it is envisioned that the IPI will only be valid on all 8 lanes simultaneously.

In many embodiments, one or more IPI words may be inserted by a transmitter while transmitting a data packet while still allowing a receiver to identify corrupted packets and drop the corrupted packets. In the transmitter, no pre-fetch buffer is needed, thus eliminating a store and forward stage next to the TX MAC. While in a middle of transmitting the data packet, and if there is no data available for transmission, the TX MAC can generate the IPI words. In some embodiments, the IPI words may be a control word that is reserved for this purpose. The IPI words may be transmitted until a valid data reaches to the MAC. Using predetermined IPI words at the MAC (XGMII) level ensures that an IPI compatible RX MAC can identify the IPI words and can filter out real corrupted packets. XGMII generally refers to 10 Gigabit Media Independent Interface used in networking to connect physical layer devices, such as Ethernet transceivers, with data link layer devices, such as Ethernet MAC controllers. Similarly, in the receiver, when in the middle of receiving the data packet, the IPI words may be identified and ignored, and the data packet can remain active. In other words, the RX MAC waits for the rest of the data packet to arrive. In certain embodiments, the number of continuous IPI words transmitted in the middle of the data packet may be limited to a configurable threshold value to ensure that there is no deadlock. In more embodiments, the IPI words can be included for determining a Cyclic Redundancy Check (CRC) code corresponding to the data packet. In some more embodiments, the IPI words may be excluded from the CRC code. In numerous embodiments, inserting the IPI words may eliminate the out of order delivery of the data packets from a system memory to the MAC layer. Generally, out of order delivery of data may require large buffers for the data packets to be delivered to the MAC layer. If these large buffers are shared, the conflicts in accessing the buffers may further cause unpredictability in performance. By utilizing the IPI words, the need for large buffers may be eliminated, thereby reducing the unpredictability in the performance.

Although a specific embodiment for the changes to the RS for carrying out the various steps, processes, methods, and operations described herein is discussed with respect to FIG. 3, any of a variety of systems and/or processes may be utilized in accordance with embodiments of the disclosure. For example, the IPI word may be selected and/or encoded by one or more encoding standards to achieve a desired error correction metric. The elements depicted in FIG. 3 may also be interchangeable with other elements of FIGS. 1-2 and 4-11 as required to realize a particularly desired embodiment.

Referring to FIG. 4, a conceptual illustration of changes to the PCS, in accordance with various embodiments of the disclosure are shown. In many embodiments, the IPI word may be encoded, for which sample input data, sync, and block payload are shown in FIG. 4. In some embodiments, the IPI word may be transmitted in groups of 8 bytes, and can be deleted to adapt between clock rate, but cannot be inserted. In certain embodiments, the IPI may only be transmitted after a data character or a previous IPI word. In more embodiments, the PCS layer can encode and/or decode data bits to be transmitted over the physical medium. The PCS layer may receive framed data from the RS layer and may perform various encoding schemes to convert the data into a format suitable for transmission. The encoding process may involve converting binary data into a specific line code or modulation scheme. In some more embodiments, certain changes are described with respect to the RS and PCS Ethernet port layers. In numerous embodiments, different signaling may be selected, programmed, or otherwise included without exceeding beyond the spirit and scope of the instant disclosure.

Although a specific embodiment for the changes to the PCS for carrying out the various steps, processes, methods, and operations described herein is discussed with respect to FIG. 4, any of a variety of systems and/or processes may be utilized in accordance with embodiments of the disclosure. For example, the PCS alter encoding and/or decoding of the IPI word to suit one or more requirements of Ethernet network. The elements depicted in FIG. 4 may also be interchangeable with other elements of FIGS. 1-3 and 5-11 as required to realize a particularly desired embodiment.

Figure 5:
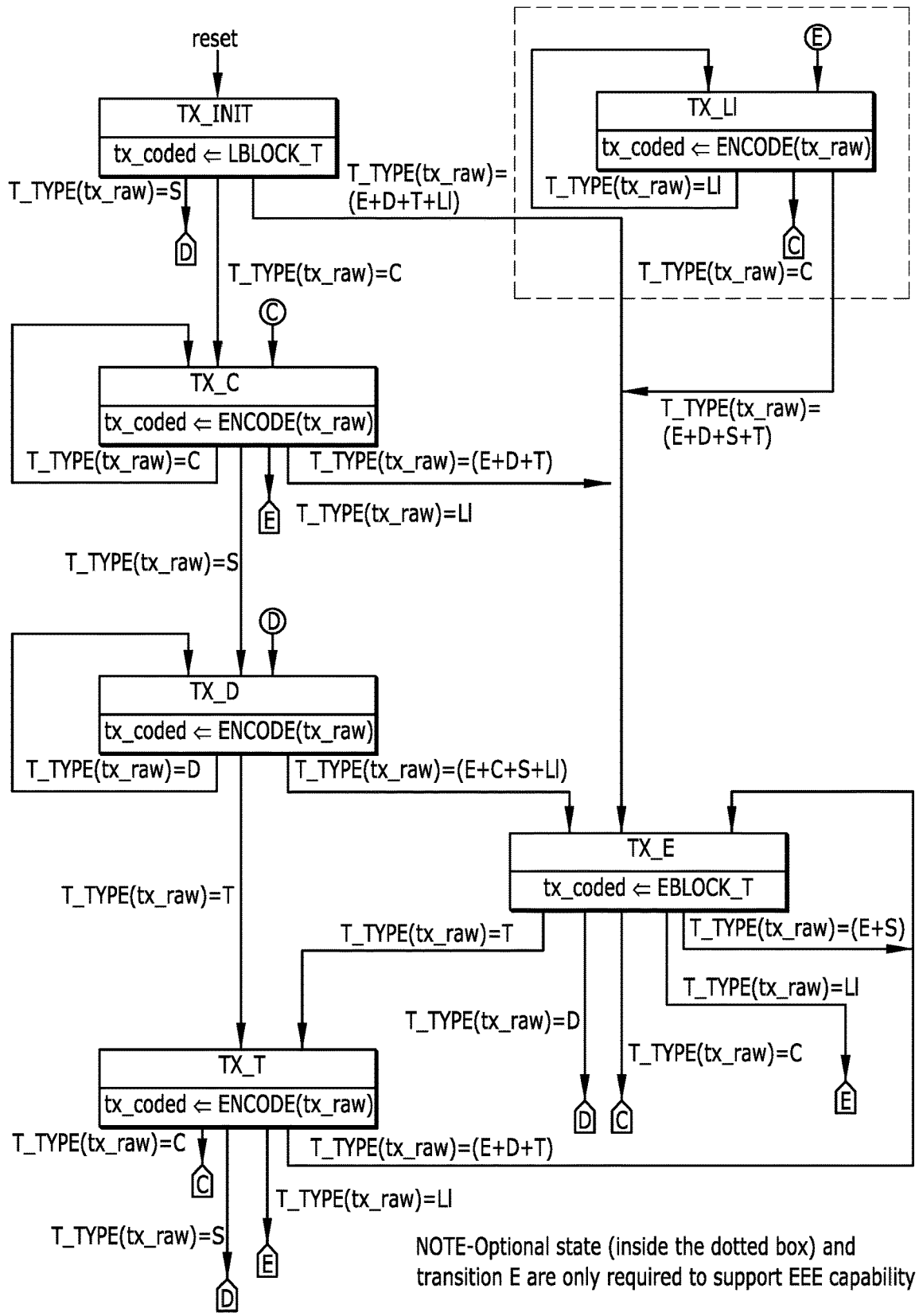
FIG. 5 is a conceptual state diagram for transmission, in accordance with various embodiments of the disclosure.

Referring to FIG. 5 is a conceptual state diagram for transmission, in accordance with various embodiments of the disclosure is shown. In many embodiments, the IPI may be described to desirably reduce latency by eliminating TX buffering. In some embodiments, when in the middle of transmitting the data packet and there is no data available to transmit, the IPI word may be sent. Furthermore, the IPI word may be utilized with a specific sequence. When the RX identifies the IPI word in the middle of the data packet, the RX discards the IPI word and waits for the rest of the data packet data to arrive. In certain embodiments, the RX does not discard the data packet as a runt packet. When in the middle of the transmission of the data packet, i.e., after sending "start", but before sending "terminate", there is no valid indication (PLS_DATA.request) from the MAC, the RS generates an IPI transaction on the XGMII interface.

Although a specific embodiment for the state diagram for transmission for carrying out the various steps, processes, methods, and operations described herein is discussed with respect to FIG. 5, any of a variety of systems and/or processes may be utilized in accordance with embodiments of the disclosure. For example, the TX continuously transmits multiple parts of the data packet and the IPI words to avoid packet loss. The elements depicted in FIG. 5 may also be interchangeable with other elements of FIGS. 1-4 and 6-11 as required to realize a particularly desired embodiment.

Figure 6:
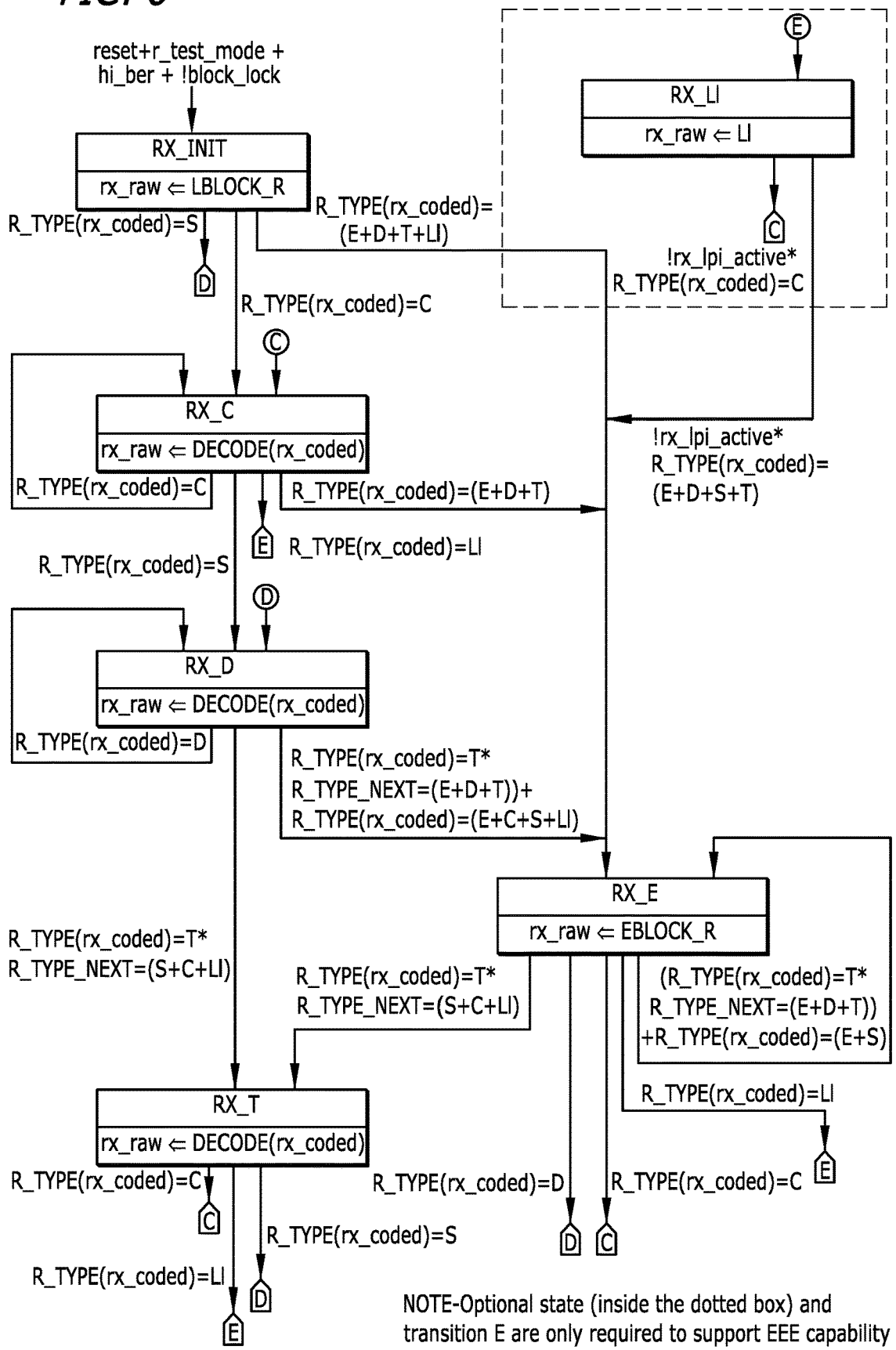
FIG. 6 is a conceptual state diagram for reception, in accordance with various embodiments of the disclosure.

Referring to FIG. 6 is a conceptual state diagram for reception, in accordance with various embodiments of the disclosure s shown. In many embodiments, the IPI generation stops when a valid indication of 64 bits is received from the MAC, or when the number of transmitted IPI exceeds a configurable threshold value. In some embodiments, setting the configurable threshold to 0 disables the maximum limit for transmission of the IPI words. The maximum limit may be set to avoid lock due to internal loss of information at the higher layers. The configurable threshold value should be set to a limit that covers a maximum expected latency of data to reach from a packet memory to the MAC. With respect to RS receive, the RS maintains a state whether it is in the middle of the data packet reception of not. When in the middle of the data packet and the IPI word is received, the RS de-asserts an indication towards the MAC but opposed to other control characters detected in a middle of the data packet, the RS does not move to the error state.

Although a specific embodiment for the state diagram for transmission for carrying out the various steps, processes, methods, and operations described herein is discussed with respect to FIG. 6, any of a variety of systems and/or processes may be utilized in accordance with embodiments of the disclosure. For example, the RX continuously receives multiple parts of the data packet and retrieves the data packet without switching to an error state. The elements depicted in FIG. 6 may also be interchangeable with other elements of FIGS. 1-5 and 7-11 as required to realize a particularly desired embodiment.

Figure 7:
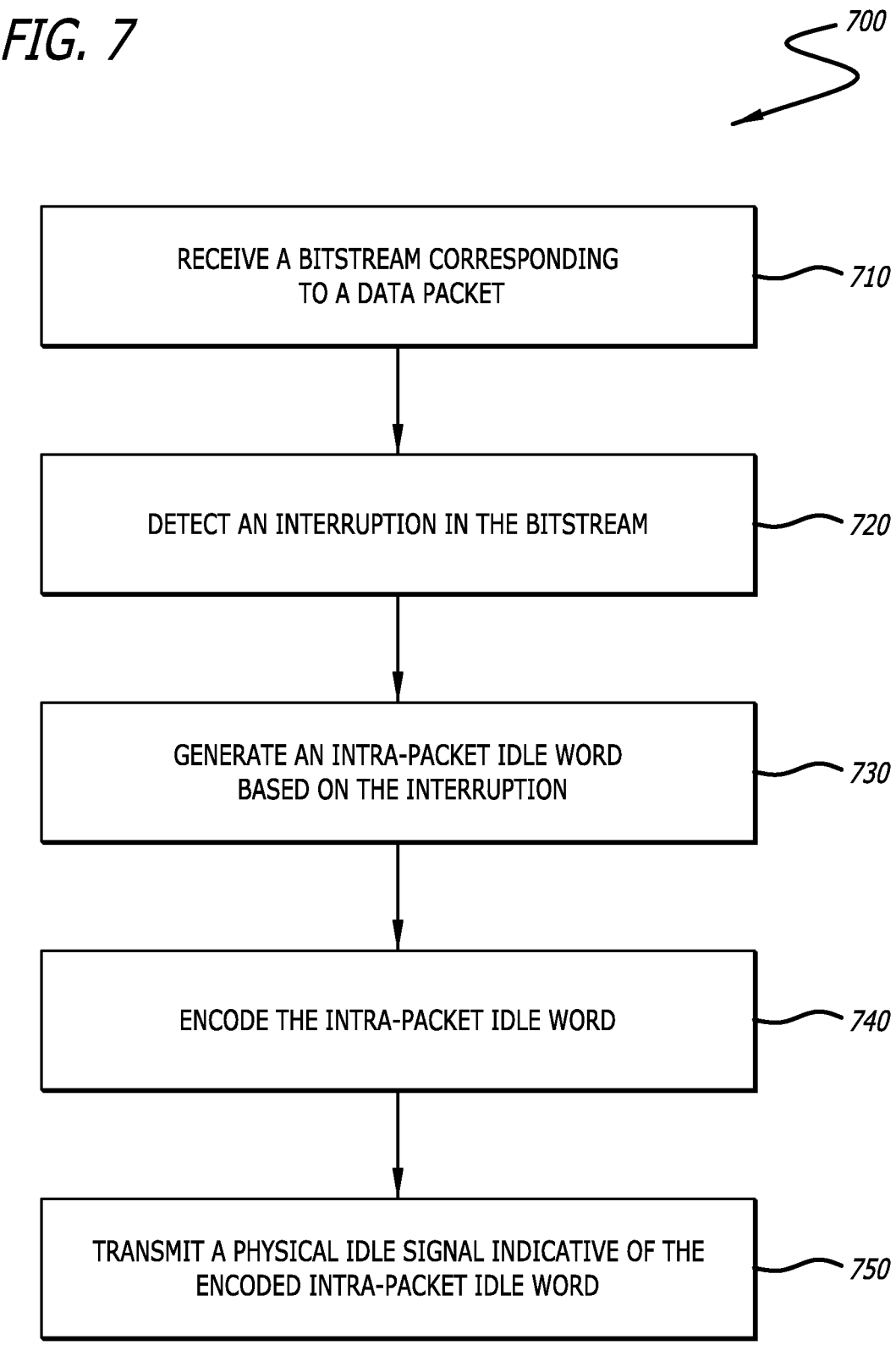
FIG. 7 is a flowchart depicting a process for transmitting a physical idle signal, in accordance with various embodiments of the disclosure.

Referring to FIG. 7, is a flowchart depicting a process 700 for transmitting a physical idle signal, in accordance with various embodiments of the disclosure is shown. In many embodiments, the process 700 can receive the bitstream corresponding to the data packet (block 710). In some embodiments, the process 700 may receive a frame including the data packet. In certain embodiments, the data packet may correspond to an Ethernet packet or an Ethernet frame. In more embodiments, the process 700 can receive the data packet from the MAC in the transmitter.

In a number of embodiments, the process 700 can detect an interruption or a gap in the bitstream (block 720). In some embodiments, the interruption or the gap may be caused due to internal non-deterministic processing time. In certain embodiments, there may be more than one interruption in the bitstream, i.e., there can be more than one interruption during the transmission of the data packet.

In various embodiments, the process 700 may generate one or more IPI words when the interruption or the gap occurs (block 730). In some embodiments, the process 700 may generate the IPI words based on the configured threshold value stored in a memory of the transmitter. In certain embodiments, the configurable threshold value may be a predetermined value. In more embodiments, the configurable threshold value can be set to suit a transmission requirement of the communication network. In some more embodiments, the configurable threshold value may be indicative of a maximum number of IPI words that can be transmitted in one interruption or gap. In numerous embodiments, the process 700 may transmit a generate and transmit a number of IPI words less than or equal to the configurable threshold value.

In additional embodiments, the process 700 can encode the IPI words (block 740). In some embodiments, the IPI word may include a predetermined bit sequence. In certain embodiments, the bit sequence can be selected based on a required error correction metric, such as, but not limited to a minimum Hamming distance. In more embodiments, the process 700 may select an encoding standard for encoding the IPI words. In some more embodiments, the process 700 can encode the IPI words based on the selected encoding standard. In numerous embodiments, the process 700 may generate the encoded IPI word.

In further embodiments, the process 700 may transmit a physical idle signal (block 750). In some embodiments, the physical idle signal can be transmitted over the physical medium of the communication network. In certain embodiments, the examples of the physical medium utilized in Ethernet may include, but are not limited to, fiber-optic cables, copper cables, or wireless connections. In more embodiments, the examples of the physical signals may include, but are not limited to, electrical signals, optical signals, or wireless Radio Frequency (RF) signals. In some more embodiments, the process 700 can generate and transmit multiple physical idle signals during the interruption.

Although a specific embodiment for transmitting the physical idle signals for carrying out the various steps, processes, methods, and operations described herein is discussed with respect to FIG. 7, any of a variety of systems and/or processes may be utilized in accordance with embodiments of the disclosure. In many non-limiting examples, the process may generate and transmit the IPI words continuously in real-time or near-real-time over the physical medium. The elements depicted in FIG. 7 may also be interchangeable with other elements of FIGS. 1-6 and 8-11 as required to realize a particularly desired embodiment.

Figure 8:
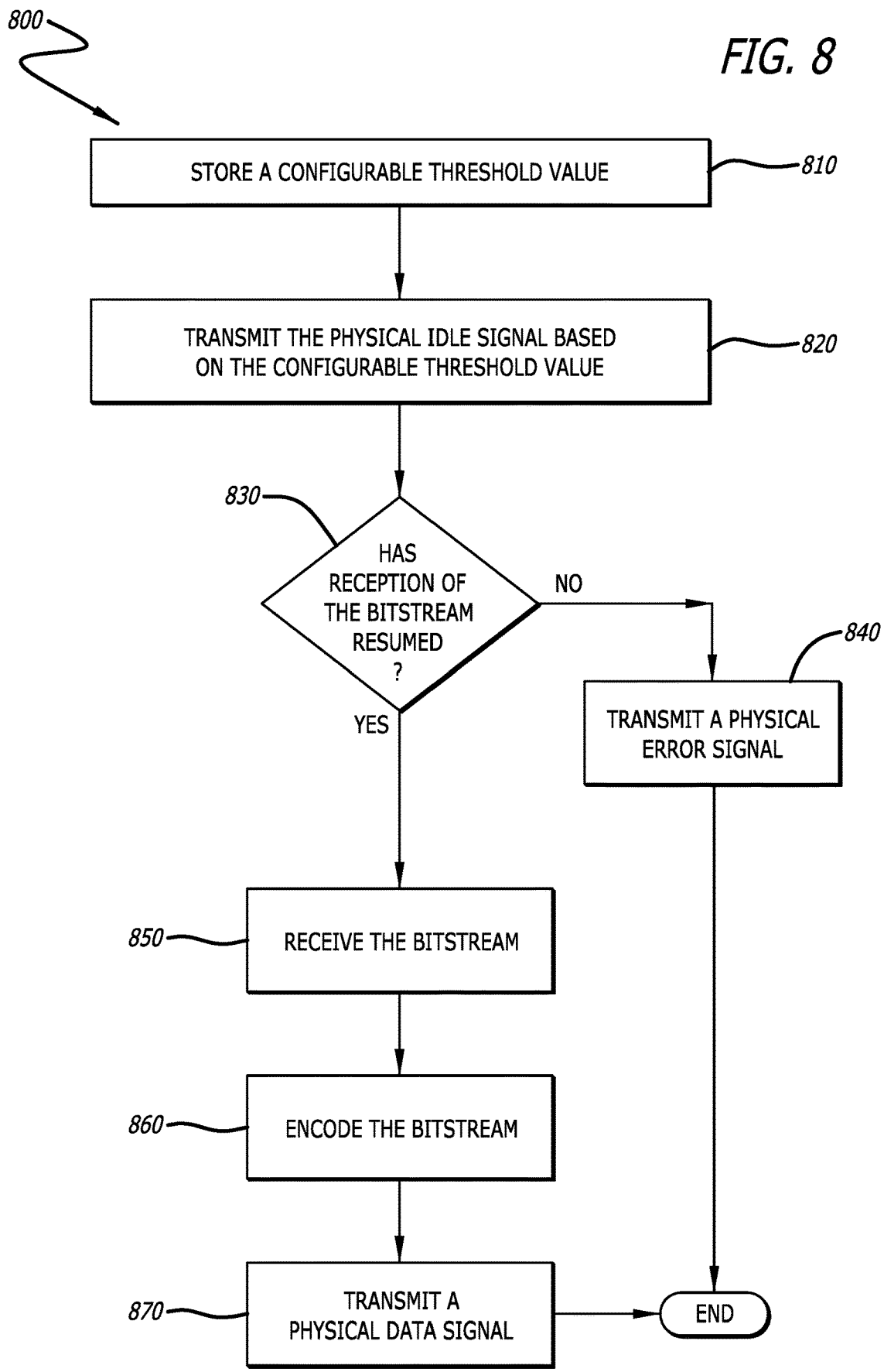
FIG. 8 is a flowchart depicting a process for transmitting a physical data signal or a physical error signal, in accordance with various embodiments of the disclosure.

Referring to FIG. 8, a flowchart depicting a process 800 for transmitting a physical data signal or a physical error signal, in accordance with various embodiments of the disclosure is shown. In many embodiments, the process 800 stores the configurable threshold value is stored in the memory of the device that includes the transmitter (block 810). In some examples, the configurable threshold value may be set by an operator of the device. In certain embodiments, the configurable threshold value may be dynamically selected at run time. In more embodiments, the configurable threshold value can be communicated to the receiver or one or more devices in the communication network.

In a number of embodiments, the process 800 can transmit the physical idle signal based on the configurable threshold value (block 820). In some embodiments, the process 800 may transmit the number of IPI words less than or equal to the maximum number of IPI words indicated by the configurable threshold value. In certain embodiments, if the configurable threshold value is set to zero, the process 800 can transmit the IPI words continuously during the interruption or the gap in the transmission.

In various embodiments, the process 800 may check if the reception of the bitstream has resumed (block 830). In some embodiments, the process 800 may receive the bitstream within a predetermined time period if the interruption is caused due to internal non-deterministic processing time. In certain embodiments, the process 800 may not receive the bitstream if the interruption is caused due to internal loss of data.

In additional embodiments, if the process 800 does not detect that the reception of the bitstream has resumed, the process 800 can generate a physical error signal (block 840). In some embodiments, the receiver may receive the error signal and discard the part of the data packet received before receiving the physical error signal. In certain embodiments, the transmitter may re-initiate the transmission of the data packet after transmitting the physical error signal.

In further embodiments, if the process 800 detects that the reception of the bitstream has resumed, the process 800 may resume the reception of the bitstream (block 850). In some embodiments, the process 800 may receive a next part of the data packet. In certain embodiments, the data packet may be transmitted in form of multiple parts of the data packet.

In many more embodiments, the process 800 can encode the bitstream (block 860). In some embodiments, the process 800 may generate the encoded bitstream corresponding to the data packet or the part of the data packet. In certain embodiments, a size of the data packet may be equal to or less than the MTU.

In many additional embodiments, the process 800 may transmit the physical data signal based on the encoded bitstream (block 870). In some embodiments, a type of the physical data signal may be selected based on the physical medium utilized by the communication network. In certain embodiments, the physical signal may be received and decoded by the receiver to retrieve the data packet or the part of the data packet.

Although a specific embodiment for transmitting the physical data signals for carrying out the various steps, processes, methods, and operations described herein is discussed with respect to FIG. 8, any of a variety of systems and/or processes may be utilized in accordance with embodiments of the disclosure. In many non-limiting examples, the process 800 may generate and transmit the physical error signals to avoid the deadlock in the transmission and reception of the data packets. The elements depicted in FIG. 8 may also be interchangeable with other elements of FIGS. 1-7 and 9-11 as required to realize a particularly desired embodiment.

Figure 9:
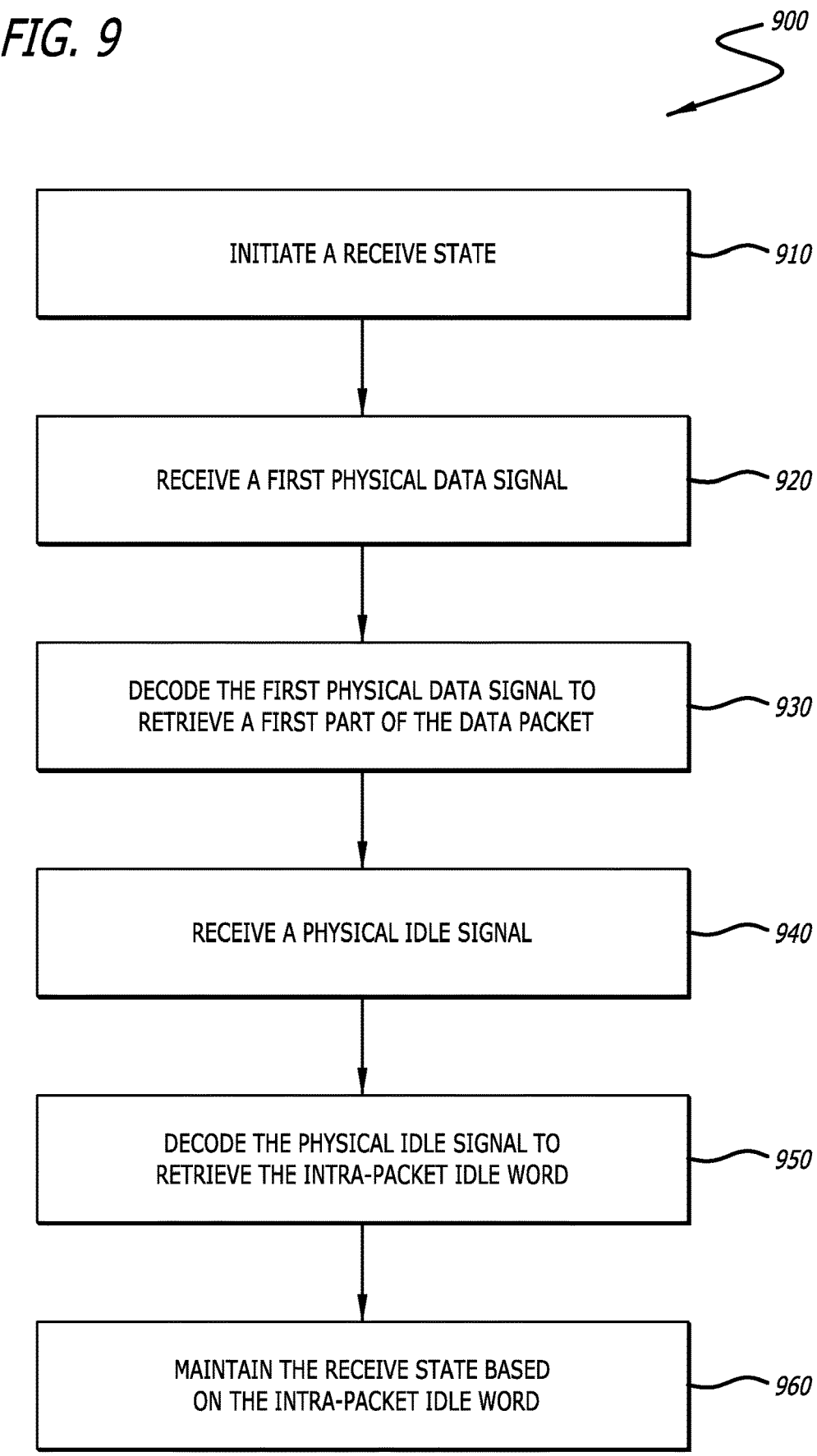
FIG. 9 is a flowchart depicting a process for receiving and processing an Intra-Packet Idle (IPI) word, in accordance with various embodiments of the disclosure.

Referring to FIG. 9, a flowchart depicting a process 900 for receiving and processing the IPI word, in accordance with various embodiments of the disclosure is shown. In many embodiments, the process 900 may initiate the receiver in the receive state (block 910). In some embodiments, the receiver receives one or more physical data signals or one or more physical idle signals in the receive state. In certain embodiments, the process 900 can maintain the receive state of the receiver until the physical error signal is received. In more embodiments, the first physical data signal may be an electrical signal, an optical signal, or a wireless RF signal received by the receiver through the physical medium.

In a number of embodiments, the process 900 may receive the first physical data signal (block 920). In some embodiments, the first physical data signal can correspond to the first part of the data packet. In certain embodiments, the data packet may be divided into one or more parts based on a number of interruptions or gaps in the transmission of the data packet. In more embodiments, the process 900 may receive one physical data signal corresponding to each part of the data packet.

In various embodiments, the process 900 can decode the first physical data signal (block 930). In some embodiments, the process 900 may use a decoding technique corresponding to an encoding technique utilized by the transmitter. In certain embodiments, the process 900 may retrieve the first part of the data packet. In more embodiments, the process 900 can store the first part of the data packet in a memory in the receiver or can forward the first part of the data packet to a processor in the receiver.

In additional embodiments, the process 900 may receive the physical idle signal (block 940). In some embodiments, the first physical idle signal is indicative of a gap in the transmission of the data packet. In certain embodiments, the process 900 can receive multiple physical idle signals consecutively. In more embodiments, each physical idle signal received by the process 900 may correspond to an IPI word. In some more embodiments, the number of the IPI words received by the process 900 may be less than or equal to the maximum number of IPI words indicated by the configurable threshold value.

In further embodiments, the process 900 can decode the physical idle signal (block 950). In some embodiments, the process 900 may retrieve the IPI word indicated by the physical idle signal. In certain embodiments, the process 900 can discard or ignores the IPI word. In more embodiments, if the process 900 may further discard all the subsequent IPI words and wait for receiving the next physical data signal.

In many more embodiments, the process 900 may maintain the receiver in the receive state while discarding the received IPI words (block 960). In some embodiments, the process 900 does not switch the receiver to the error state during the gap in the reception of the data packet. In certain embodiments, the process 900 generates an error only when the process 900 receives neither the physical data signal nor the physical error signal. In more embodiments, the process 900 may discard the first part of the data packet for being runt packet, corrupted, or underrun, if the process 900 does not receive the next physical data signal after receiving the maximum number of IPI words. In some more embodiments, the process 900 may generate the error after determining that the packet is runt packet, corrupted, or underrun.

Although a specific embodiment for receiving and processing the IPI word for carrying out the various steps, processes, methods, and operations described herein is discussed with respect to FIG. 9, any of a variety of systems and/or processes may be utilized in accordance with embodiments of the disclosure. In many non-limiting examples, the process 900 may facilitate continuously receiving the data packet, even where there are multiple interruptions or gaps while receiving the data packet, without switching the receiver to the error state. The elements depicted in FIG. 9 may also be interchangeable with other elements of FIGS. 1-8 and 10-11 as required to realize a particularly desired embodiment.

Figure 10:
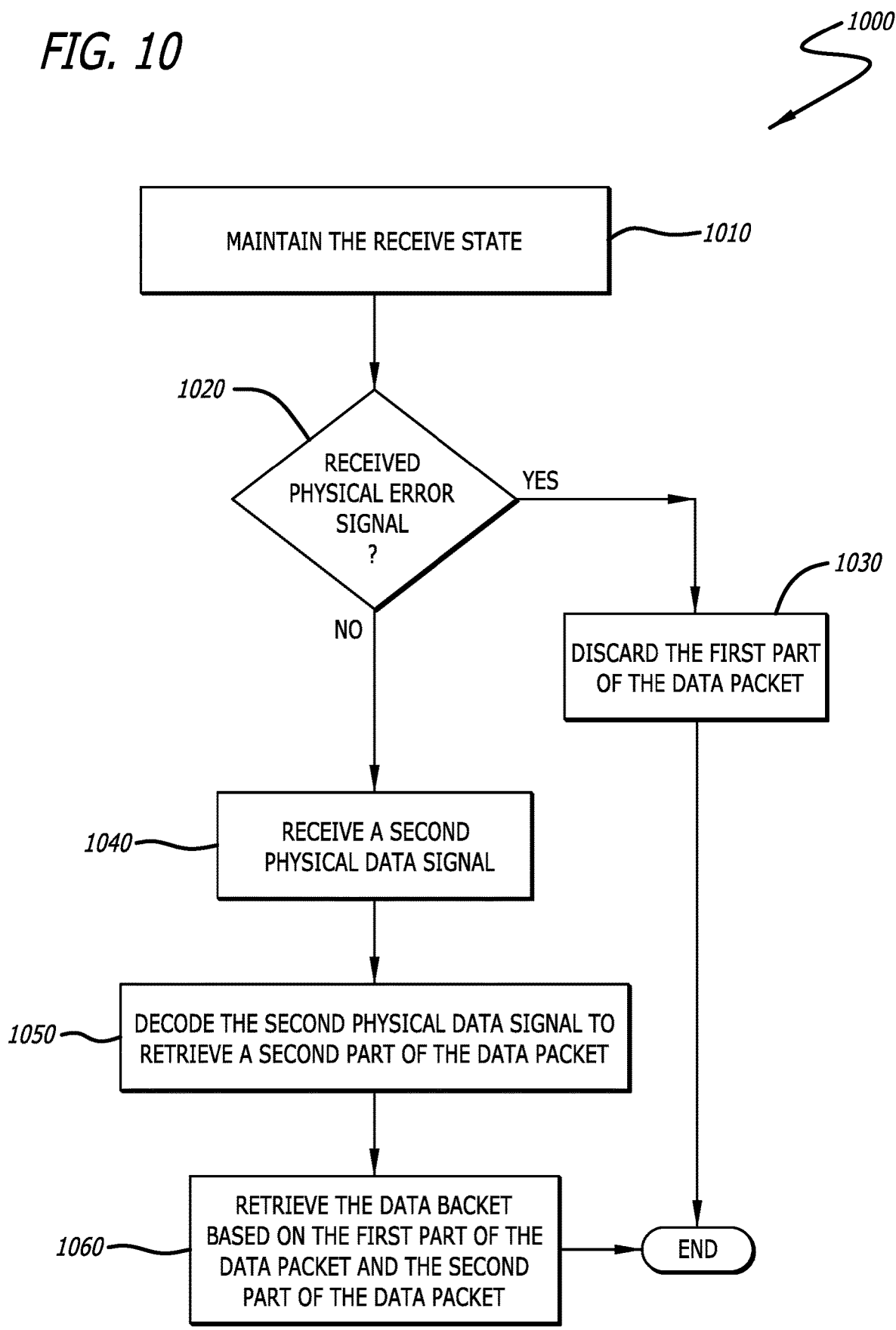
FIG. 10 is a flowchart depicting a process for retrieving a data packet, in accordance with various embodiments of the disclosure.

Referring to FIG. 10, a flowchart depicting a process 1000 for retrieving a data packet, in accordance with various embodiments of the disclosure is shown. In many embodiments, the process 1000 may maintain the receiver in the receive state (block 1010). In some embodiments, the process 1000 can ignore or discard the IPI words received during the gap in the reception of the data packet. In certain embodiments, during the interruption or the gap in the reception, the process 1000 may wait to receive the next physical data signal or the physical error signal without moving to the error state.

In a number of embodiments, the process 1000 can determine if the physical error signal is received (block 1020). In some embodiments, the process 1000 may receive the physical error signal after receiving the maximum number of IPI words. In certain embodiments, the physical error signal may indicate the data packet is runt packet, corrupted, or underrun. In more embodiments, the physical error signal may indicate the internal data loss at the transmitter. In some more embodiments, the physical error signal may indicate the internal non-deterministic processing time at the transmitter beyond a predetermined threshold delay.

In various embodiments, if the process 1000 determines that the physical error signal is received, the process 1000 may discard the first part of the data packet (block 1030). In some embodiments, after discarding the first part of the data packet, the process 1000 may indicate the error to the RX MAC. Thereafter, in certain embodiments, the process 1000 may wait to receive the next physical data signal. In more embodiments, depending on a communication protocol, the process 1000 may request for retransmission of the data packet.

In additional embodiments, if the process 1000 determines that the physical error signal is not received, the process 1000 may wait to receive the next physical data signal (block 1040). In some embodiments, the process 1000 can receive the second physical data signal indicative of the next part or the second part of the data packet. In certain embodiments, when the data packet is transmitted in multiple parts due to interruptions, the process 1000 may receive multiple physical data signals and multiple physical idle signals subsequent to receiving the second physical data signal.

In further embodiments, the process 1000 can decode the second physical data signal (block 1050). In some embodiments, the process 1000 may use the same decoding technique utilized for decoding the first physical data signal. In certain embodiments, the process 1000 may retrieve the second part of the data packet. In more embodiments, the process 1000 can store the second part of the data packet in the memory of the receiver.

In many more embodiments, the process 1000 may retrieve the entire data packet (block 1060). In some embodiments, the process 1000 can retrieve the data packet based on the first part of the data packet and the second part of the data packet. However, in certain embodiments, when the data packet is divided into multiple parts, the process 1000 may retrieve the data packet based on all the received and decoded parts of the data packet.

Although a specific embodiment for retrieving the data packet for carrying out the various steps, processes, methods, and operations described herein is discussed with respect to FIG. 10, any of a variety of systems and/or processes may be utilized in accordance with embodiments of the disclosure. In many non-limiting examples, the process 1000 may facilitate continuous reception of the data packet while also allowing the identification of the runt packets. The elements depicted in FIG. 10 may also be interchangeable with other elements of FIGS. 1-9 11 as required to realize a particularly desired embodiment.

Figure 11:
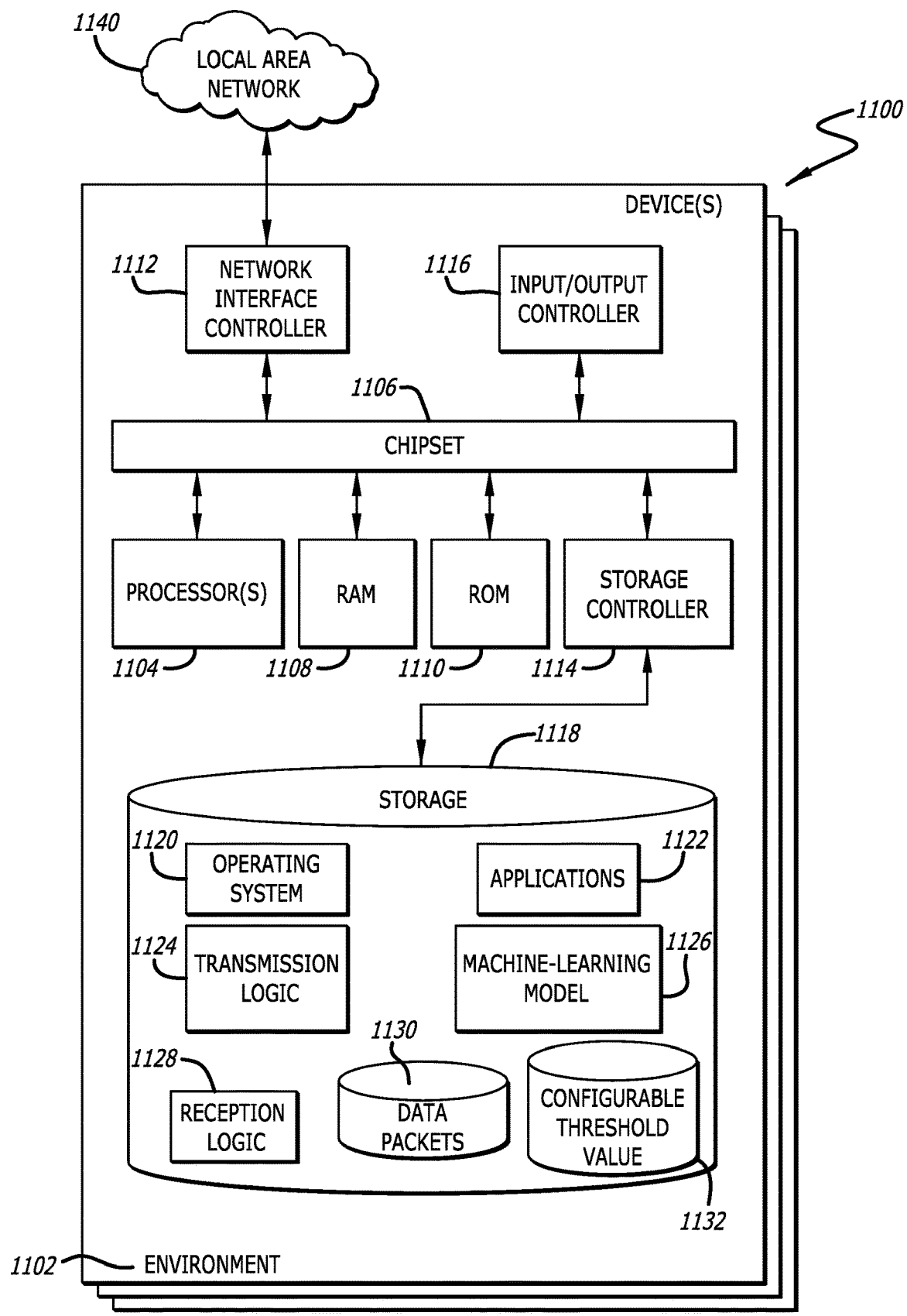
FIG. 11 is a conceptual block diagram of a device suitable for configuration with a transmission logic and a reception logic, in accordance with various embodiments of the disclosure.

Referring to FIG. 11, a conceptual block diagram of a device 1100 suitable for configuration with a transmission logic and a reception logic, in accordance with various embodiments of the disclosure is shown. The embodiment of the conceptual block diagram depicted in FIG. 11 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 11 can also illustrate an access point, a switch, or a router in accordance with various embodiments of the disclosure. The device 1100 may, in many non-limiting examples, correspond to physical devices or to virtual resources described herein.

In many embodiments, the device 1100 may include an environment 1102 such as a baseboard or "motherboard," in physical embodiments that can be configured as a printed circuit board with a multitude of components or devices connected by way of a system bus or other electrical communication paths. Conceptually, in virtualized embodiments, the environment 1102 may be a virtual environment that encompasses and executes the remaining components and resources of the device 1100. In more embodiments, one or more processors 1104, such as, but not limited to, central processing units ("CPUs") can be configured to operate in conjunction with a chipset 1106. The processor(s) 1104 can be standard programmable CPUs that perform arithmetic and logical operations necessary for the operation of the device 1100.

In a number of embodiments, the processor(s) 1104 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 1106 may provide an interface between the processor(s) 1104 and the remainder of the components and devices within the environment 1102. The chipset 1106 can provide an interface to a random-access memory ("RAM") 1108, which can be used as the main memory in the device 1100 in some embodiments. The chipset 1106 can further be configured to provide an interface to a computer-readable storage medium such as a read-only memory ("ROM") 1110 or non-volatile RAM ("NVRAM") for storing basic routines that can help with various tasks such as, but not limited to, starting up the device 1100 and/or transferring information between the various components and devices. The ROM 1110 or NVRAM can also store other application components necessary for the operation of the device 1100 in accordance with various embodiments described herein.

Additional embodiments of the device 1100 can be configured to operate in a networked environment using logical connections to remote computing devices and computer systems through a network, such as the network 1140. The chipset 1106 can include functionality for providing network connectivity through a network interface card ("NIC") 1112, which may comprise a gigabit Ethernet adapter or similar component. The NIC 1112 can be capable of connecting the device 1100 to other devices over the network 1140. It is contemplated that multiple NICs 1112 may be present in the device 1100, connecting the device to other types of networks and remote systems.

In further embodiments, the device 1100 can be connected to a storage 1118 that provides non-volatile storage for data accessible by the device 1100. The storage 1118 can, for instance, store an operating system 1120, applications 1122, data packets 1130, and a configurable threshold value 1132 which are described in greater detail below. The storage 1118 can be connected to the environment 1102 through a storage controller 1114 connected to the chipset 1106. In certain embodiments, the storage 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1100 can store data within the storage 1118 by transforming the physical state of the physical storage units to reflect the information being stored. The specific transformation of physical state can depend on various factors. Examples of such factors can include, but are not limited to, the technology used to implement the physical storage units, whether the storage 1118 is characterized as primary or secondary storage, and the like.

In many more embodiments, the device 1100 can store information within the storage 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1100 can further read or access information from the storage 918 by detecting the physical states or characteristics of one or more particular locations within the physical storage units.

In addition to the storage 1118 described above, the device 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1100. In some examples, the operations performed by a cloud computing network, and or any components included therein, may be supported by one or more devices similar to device 1100. Stated otherwise, some or all of the operations performed by the cloud computing network, and or any components included therein, may be performed by one or more devices 1100 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1118 can store an operating system 1120 utilized to control the operation of the device 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1118 can store other system or application programs and data utilized by the device 1100.

In many additional embodiments, the storage 1118 or other computer-readable storage media is encoded with computer-executable instructions which, when loaded into the device 1100, may transform it from a general-purpose computing system into a special-purpose computer capable of implementing the embodiments described herein. These computer-executable instructions may be stored as application 1122 and transform the device 1100 by specifying how the processor(s) 1104 can transition between states, as described above. In some embodiments, the device 1100 has access to computer-readable storage media storing computer-executable instructions which, when executed by the device 1100, perform the various processes described above with regard to FIGS. 1-10. In certain embodiments, the device 1100 can also include computer-readable storage media having instructions stored thereupon for performing any of the other computer-implemented operations described herein.

In many further embodiments, the device 1100 may include a transmission logic 1124 and a reception logic 1128. The transmission logic 1124 and the reception logic 1128 can be configured to perform one or more of the various steps, processes, operations, and/or other methods that are described above. Often, the transmission logic 1124 and the reception logic 1128 can be a set of instructions stored within a non-volatile memory that, when executed by the processor(s)/controller(s) 1104 can carry out these steps, etc. In some embodiments, the the transmission logic 1124 and the reception logic 1128 may be a client application that resides on a network-connected device, such as, but not limited to, a server, switch, personal or mobile computing device in a single or distributed arrangement. In certain embodiments, the transmission logic 1124 can transmit a data packet in multiple parts when there are gaps or interruptions in the transmission by transmitting one or more IPI words during the gap. The transmission logic 1124 may also identify the runt packets. The reception logic 1128 may receive the IPI words and data packet in multiple parts. The reception logic 1128 can retrieve the data packet based on the received parts of the data packet.

In still further embodiments, the device 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can be configured to provide output to a display, such as a computer monitor, a flat panel display, a digital projector, a printer, or other type of output device. Those skilled in the art will recognize that the device 1100 might not include all of the components shown in FIG. 11 and can include other components that are not explicitly shown in FIG. 11 or might utilize an architecture completely different than that shown in FIG. 11.

As described above, the device 1100 may support a virtualization layer, such as one or more virtual resources executing on the device 1100. In some examples, the virtualization layer may be supported by a hypervisor that provides one or more virtual machines running on the device 1100 to perform functions described herein. The virtualization layer may generally support a virtual resource that performs at least a portion of the techniques described herein.

Finally, in numerous additional embodiments, data may be processed into a format usable by a machine-learning model 1126 (e.g., feature vectors), and or other pre-processing techniques. The machine-learning ("ML") model 1126 may be any type of ML model, such as supervised models, reinforcement models, and/or unsupervised models. The ML model 1126 may include one or more of linear regression models, logistic regression models, decision trees, Naïve Bayes models, neural networks, k-means cluster models, random forest models, and/or other types of ML models 1126.

The ML model(s) 1126 can be configured to generate inferences to make predictions or draw conclusions from data. An inference can be considered the output of a process of applying a model to new data. This can occur by learning from at least the stored data packets 1130 and the configurable threshold value 1132 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 1126 may be generated by human/administrator verifications or may compare predicted outcomes with actual outcomes.

Although a specific embodiment for a device suitable for configuration with a transmission logic and a reception logic for carrying out the various steps, processes, methods, and operations described herein is discussed with respect to FIG. 11, any of a variety of systems and/or processes may be utilized in accordance with embodiments of the disclosure. For example, the device may be in a virtual environment such as a cloud-based network administration suite, or it may be distributed across a variety of network devices or APs. The elements depicted in FIG. 11 may also be interchangeable with other elements of FIGS. 1-10 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
    a processor;
    a memory communicatively coupled to the processor; and
    a transmission logic, configured to:
        receive a bitstream corresponding to a data packet;
        detect an interruption in a reception of the bitstream;
        generate an intra-packet idle word based on the interruption;
        encode the intra-packet idle word to generate an encoded intra-packet idle word; and
        transmit a physical idle signal indicative of the encoded intra-packet idle word.

2. The device of claim 1, wherein the memory is configured to store a configurable threshold value indicative of a maximum number of times of transmission of the physical idle signal during the interruption.

3. The device of claim 2, wherein the transmission logic is further configured to:
    transmit the physical idle signal based on the configurable threshold value during the interruption;
    determine if the reception of the bitstream resumes after transmitting the physical idle signal; and
    transmit a physical error signal if the reception of the bitstream does not resume.

4. The device of claim 2, wherein, when the configurable threshold value is zero, the transmission logic is further configured to transmit the physical idle signal repeatedly until the reception of the bitstream resumes.

5. The device of claim 2, wherein the configurable threshold value is greater than a maximum expected latency for the data packet.

6. The device of claim 1, wherein the intra-packet idle word includes a predetermined bit sequence.

7. The device of claim 1, wherein the transmission logic is further configured to select a bit sequence for the intra-packet idle word based on a required error correction metric.

8. The device of claim 3, wherein the transmission logic is further configured to determine an encoding standard corresponding to a type of a physical channel.

9. The device of claim 8, wherein the transmission logic is further configured to encode at least one of: the intra-packet idle word or the data packet based on the encoding standard.

10. The device of claim 9, wherein the transmission logic is further configured transmit a physical data signal indicative of an encoded data packet.

11. The device of claim 10, wherein the physical idle signal, the physical data signal, and the physical error signal are transmitted at a physical (PHY) layer in a communication network, and wherein the data packet is received from a Media Access Control (MAC) layer in the communication network.

12. The device of claim 11, wherein the device operates at a Reconciliation Sublayer (RS) in the communication network.

13. A device, comprising:
    a processor;
    a memory communicatively coupled to the processor; and
    a reception logic, configured to:
        initiate a receive state;
        receive a first physical data signal;
        decode the first physical data signal to retrieve a first part of a data packet;
        receive a physical idle signal;
        decode the physical idle signal to retrieve an intra-packet idle word;
        maintain the receive state based on the intra-packet idle word;
        receive a second physical data signal;
        decode the second physical data signal to retrieve a second part of the data packet; and
        retrieve the data packet based on the first part of the data packet and the second part of the data packet.

14. The device of claim 13, wherein the reception logic is further configured to:
    receive a physical error signal after receiving the first physical data signal, wherein the physical error signal is indicative of a runt packet; and
    discard the first part of the data packet based on the physical error signal.

15. A method, comprising:
    receiving a bitstream corresponding to a data packet;
    detecting an interruption in a reception of the bitstream;
    generating an intra-packet idle word based on the interruption;
    encoding the intra-packet idle word for generating an encoded intra-packet idle word; and
    transmitting a physical idle signal indicative of the encoded intra-packet idle word.

16. The method of claim 15, further comprising storing a configurable threshold value indicative of a maximum number of times of transmission of the physical idle signal during the interruption.

17. The method of claim 16, further comprising:
    transmitting the physical idle signal based on the configurable threshold value during the interruption;
    determining if the reception of the bitstream resumes after transmitting the physical idle signal; and
    transmitting a physical error signal if the reception of the bitstream does not resume.

18. The method of claim 15, further comprising selecting a bit sequence for the intra-packet idle word based on a required error correction metric.

19. The method of claim 15, further comprising:
    determining an encoding standard corresponding to a type of a physical channel; and
    encoding at least one of: the intra-packet idle word or the data packet based on the encoding standard.

20. The method of claim 19, further comprising transmitting a physical data signal indicative of an encoded data packet.

* * * * *